United States Patent
Bell et al.

(10) Patent No.: US 8,123,226 B2
(45) Date of Patent: Feb. 28, 2012

(54) SEAL ASSEMBLY

(75) Inventors: Michael Antoine Joseph Caroline Bell, Neuilly-sur-Seine (FR); Sylvain Denniel, Aberdeen (GB); David Brocklebank, Aberdeen (GB)

(73) Assignees: Technip France SA (FR); Technip Offshore UK Limited (GB)

( * ) Notice: Subject to any disclaimer, the term of this patent is extended or adjusted under 35 U.S.C. 154(b) by 1333 days.

(21) Appl. No.: 10/522,471

(22) PCT Filed: Jul. 24, 2003

(86) PCT No.: PCT/EP03/08115
§ 371 (c)(1),
(2), (4) Date: May 26, 2005

(87) PCT Pub. No.: WO2004/013530
PCT Pub. Date: Feb. 12, 2004

(65) Prior Publication Data
US 2005/0206086 A1    Sep. 22, 2005

(30) Foreign Application Priority Data

Jul. 26, 2002 (GB) .................................. 0217295.5

(51) Int. Cl.
*E21B 33/126* (2006.01)
(52) U.S. Cl. ........ 277/335; 277/337; 277/339; 277/934; 285/123.12
(58) Field of Classification Search .................. 277/335, 277/337, 339, 934; 285/123.12; 166/148, 166/194, 242.8
See application file for complete search history.

(56) References Cited

U.S. PATENT DOCUMENTS

| | | | | |
|---|---|---|---|---|
| 1,262,107 A * | 4/1918 | Sheasley | ........................ | 166/189 |
| 2,335,025 A * | 11/1943 | Reed | .............................. | 277/335 |
| 2,704,581 A * | 3/1955 | Potts | .............................. | 277/337 |
| 3,398,654 A * | 8/1968 | Waldrop | ......................... | 92/241 |
| 3,525,393 A * | 8/1970 | Cobbs et al. | ................... | 166/187 |
| 4,129,308 A * | 12/1978 | Hutchison | ..................... | 277/335 |
| 4,438,933 A * | 3/1984 | Zimmerman | ................. | 277/337 |
| 4,862,966 A * | 9/1989 | Lindsey et al. | ................ | 166/382 |
| 6,615,926 B2 * | 9/2003 | Hester et al. | .................. | 166/370 |
| 6,648,333 B2 * | 11/2003 | Aksit et al. | ..................... | 277/316 |
| 7,059,410 B2 * | 6/2006 | Bousche et al. | .............. | 166/296 |
| 2005/0200084 A1 * | 9/2005 | Bell | .............................. | 277/602 |

FOREIGN PATENT DOCUMENTS

GB       2 317 934 A       4/1998

OTHER PUBLICATIONS

International Search Report, dated Nov. 5, 2003.
Tough, Gordon, et al., "Innovations Key Reeled Pipe-In-Pipe Flowline for Gulf Deepwater Project", Oil & Gas Journal, Pennwell Publishing Co., Tulsa, USA, (Aug. 13, 2001), vol. 99:33, pp. 46-52.

* cited by examiner

*Primary Examiner* — Alison Pickard
(74) *Attorney, Agent, or Firm* — Ostrolenk Faber LLP

(57) ABSTRACT

A seal assembly for sealing an annular space between an inner and an outer pipe in a double-walled subsea pipeline which seal assembly comprises an annular member (1) and moveable blocking means (2, 3) and: (a) under normal operating conditions is in a non-sealing position which allows the passage of a gas through said seal assembly; and (b) is actuatable from a non-sealing position to a sealing position in response to the entry of liquid into said annular space.

15 Claims, 5 Drawing Sheets

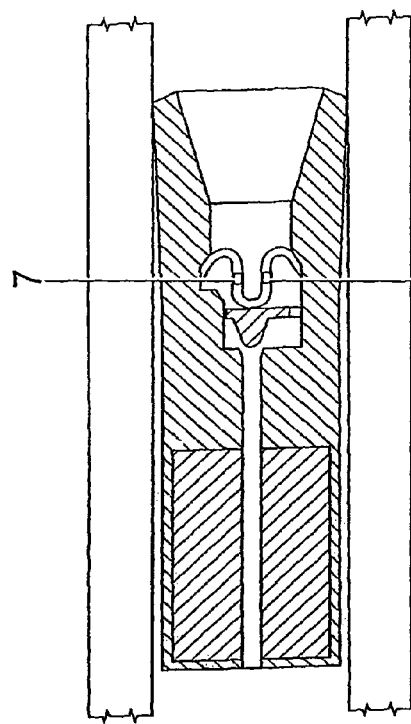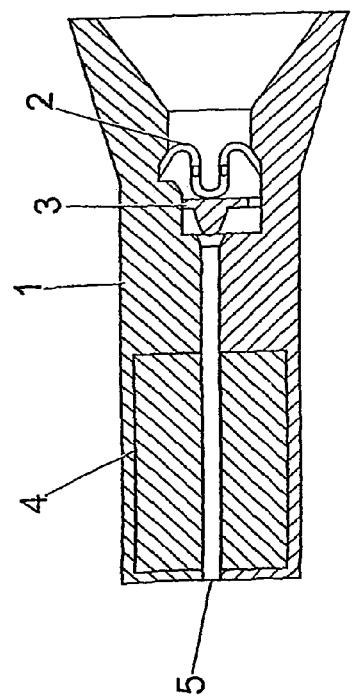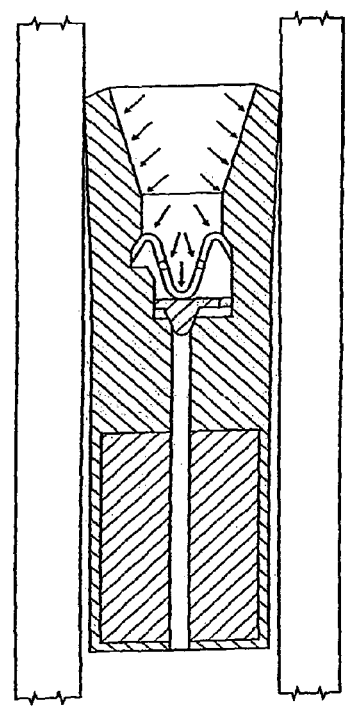

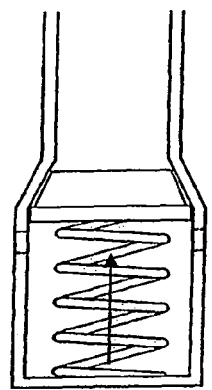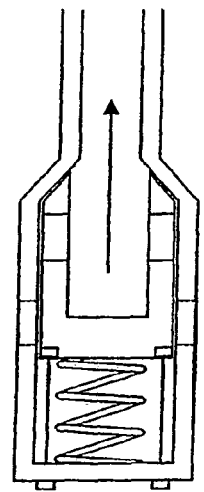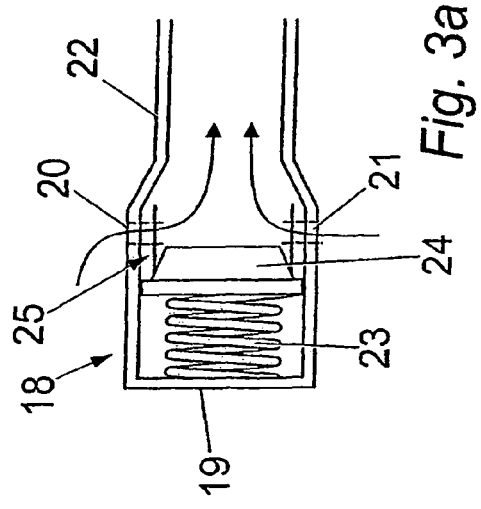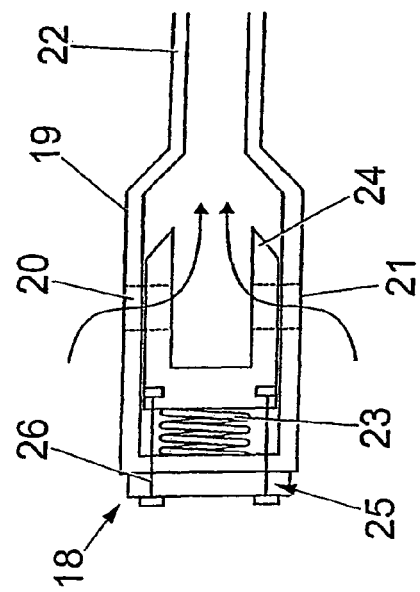

SEAL ASSEMBLY

The present invention relates to double-walled pipelines used for transporting fluids such as oil and gas. In particular it relates to a seal assembly for use in sealing an annular space between an inner pipe and an outer pipe in such a double-walled pipeline.

Pipelines carrying heavy or crude oil need to be thermally insulated as heavy oil tends to solidify during transport from a subsea production well to the surface due to heat losses in the submerged pipeline. Thermal insulation is also required to avoid the formation of hydrates which can occur for certain crude oil compositions when the crude oil cools down, for example, when there is a breakdown in production flow rate.

Production lines which require a high level of thermal insulation typically use a double-walled pipe structure, for example a pipe-in-pipe system. A pipe-in-pipe system comprises an internal pipe within an external pipe separated by an annulus volume. In such a structure, the annular space can be filled with thermal insulation material. This structure has the advantage that the external pipe keeps the annular space dry and so, for example, in subsea pipelines, the thermal insulation material is protected from water. A further advantage of this structure is that the pressure in the annulus can be different from that outside the external pipe and that inside the internal pipe. This is important if the insulating material has a particular pressure requirement or if a vacuum or partial vacuum is to be used for insulating purposes. For example, the annulus can be at atmospheric pressure while the hydrostatic pressure experienced by the external (or carrier) pipe and the internal pressure of the fluid in the internal pipe (flowline) are) different. Furthermore it is interesting to lower the pressure in the annulus in order to increase the thermal insulation performance.

One of the problems associated with such pipelines is that of safeguarding the annular space against the ingress of water, for example due to leaks in the external or carrier pipe. Water in the annular space will conduct heat from the inner flowline to the carrier pipe thus destroying the effectiveness of the insulation. This problem has been approached in prior art pipe-in-pipe systems by compartmentalising the annular space by means of permanent seals (GB 2 317 934, U.S. Pat. No. 2,930,407, WO 00/09926). It is desirable, in some cases, to have a vacuum or partial vacuum in the annular space.

When the annular space is compartmentalised by permanent seals, the vacuum or partial vacuum in the annular space must be created during the manufacture of the double walled pipe. Once manufactured, it is then not possible to vary the pressure within the compartments, for example, so as to maintain the required pressure throughout the lifetime of the pipe. An ability to vary this pressure would be useful, for example, in the case of diffusion of gases into the annulus through the internal or external pipes or a leak which modifies the pressure within the compartment and alters the thermal insulation capabilities of the pipeline. There remains a need for a pipeline for which the pressure within the annular space can be controlled during the lifetime of the pipeline and a pipeline for which the annular space can be separated into compartments in the case of a leak of water or hydrocarbon fluids into the pipeline, thus preventing flooding of the whole annular space. The above problems are solved by the seal assembly of the present invention.

In accordance with the invention there is provided a seal assembly for sealing an annular space between an inner and an outer pipe in a double-walled subsea pipeline which seal assembly under normal operating conditions is in a non-sealing position which allows the passage of a gas through said seal assembly and which seal assembly is actuatable from a non-sealing position to a sealing position in response to the entry of liquid into said annular space.

Preferably the seal assembly in its non-sealing position provides an opening in the annular space to allow the passage of a gas through the seal assembly. Preferably the seal assembly comprises an annular member and moveable blocking means such that entry of liquid into said annular space causes movement of said blocking means to close said opening.

Preferably the blocking means is moveable under pressure of liquid flow or the seal assembly comprises a liquid-sensitive material and the blocking means is moveable as a result of interaction of the liquid with said liquid-sensitive material.

Embodiments of the invention will now be described, by way of example only, with reference to the accompanying drawings in which:

FIG. 1a is a cross-sectional view of a seal assembly according to a first aspect of the present invention.

FIGS. 1b and 1c are cross-sectional views of a seal assembly according to a first aspect of the present invention in non-sealing and sealing positions respectively.

In FIG. 2b, the valve is in its non-sealing position.

FIGS. 3a and 3b are cross-sectional views of a valve for insertion into a seal assembly according to the second aspect of the present invention, in non-sealing and sealing positions respectively.

FIGS. 3c and 3d are cross-sectional views of a valve for insertion into a seal assembly according to the second aspect of the present invention, in non-sealing and sealing positions respectively.

In FIGS. 4b and 4c, the seal assembly is in a non-sealing position in the annular space between an outer pipe and an inner pipe.

Figure 1E:
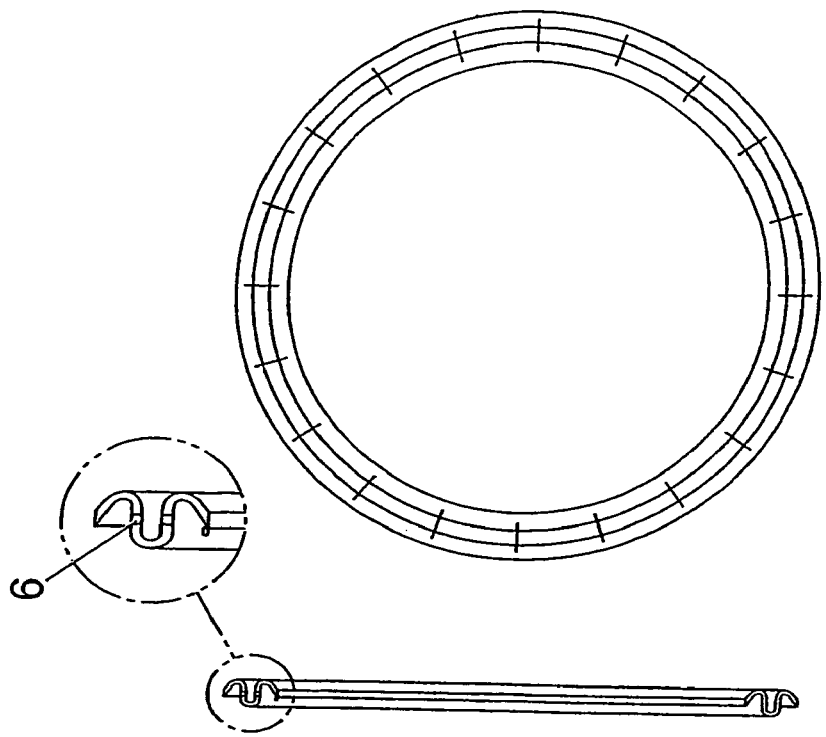
FIG. 1e is a cross-sectional view of a diaphragm and a plan view of a diaphragm.

Referring now to the drawings FIG. 1a shows a seal assembly according to a first aspect of the present invention. In the first aspect of the present invention the annular member (1) comprises one or more orifices (5) and the moveable blocking means comprises a diaphragm (2) and a closure member (4) such that flow of liquid in said annular space causes movement of the diaphragm which causes movement of the closure member to close said one or more orifices.

Preferably the annular member is capable of extending from the inner wall of the outer pipe to the outer wall of the inner pipe and of being in sealing contact with each of said inner and outer walls. By sealing contact is meant that the passage of gas or liquid through the contact interface is not possible. This is achieved by the appropriate dimensioning of the annular member. FIGS. 1b and 1c show the annular member in sealing contact with each of the inner and outer walls of the annular space in a pipe-in-pipe structure. Preferably the annular member is made from a rubber material or an elastomeric material, for example polyurethane. The annular member may comprise a steel insert (4) for strengthening/rigidity purposes.

Preferably the annular member has a longitudinal, end face which is recessed i.e., it has a concave cross-section defining upper and lower arms. Upper and lower relate to the larger circumference and the smaller circumference sides which define the end face of the annular member, respectively. Preferably, the larger diameter of the recessed end face is larger than that of the outer pipe and the smaller diameter of the recessed end face is smaller that that of the inner pipe of the pipe-in-pipe structure in which the annular member is to be used. This is so that in order to fit into the annular space, the annular member must be compressed at the recessed end. Once inserted into the annular space, the recessed end will try to expand, thus wedging the annular member in place.

FIG. 1b shows a cross-section of the above seal assembly in an annular space between inner and outer pipes in a non-sealing position. In this non-sealing position, gas can pass through the seal assembly via apertures (6,7) in the diaphragm, via a gap between the annular member and the closure member and via orifice (5) in the annular member. The annular member may have one or more orifices; the number and size of which will depend on application parameters, for example, the dimensions of the inner and outer pipes, the repartition of the waterstops along the pipeline, the length of the pipeline, the sensitivity of the moveable blocking means.

In this embodiment, both the diaphragm and the closure member are moveable. Preferably the closure member is annular in shape as can be seen from the embodiment shown in FIG. 1d. In the embodiment where the annular member has a longitudinal end face which comprises a concave cross-section defining upper and lower arms, the closure member may be attached by resilient means to one of the upper and lower arms of the annular member. Preferably there is a gap between the closure member and the other arm of the annular member to allow flow of gas past the closure member when the seal assembly is in a non-sealing position. The closure member may comprise protrusions (8) positioned on the closure member so that they correspond in position to the one or more orifices in the annular member that they are intended to plug. The protrusions are shaped so that when pressed against an orifice they will form an effective seal.

Figure 1D:
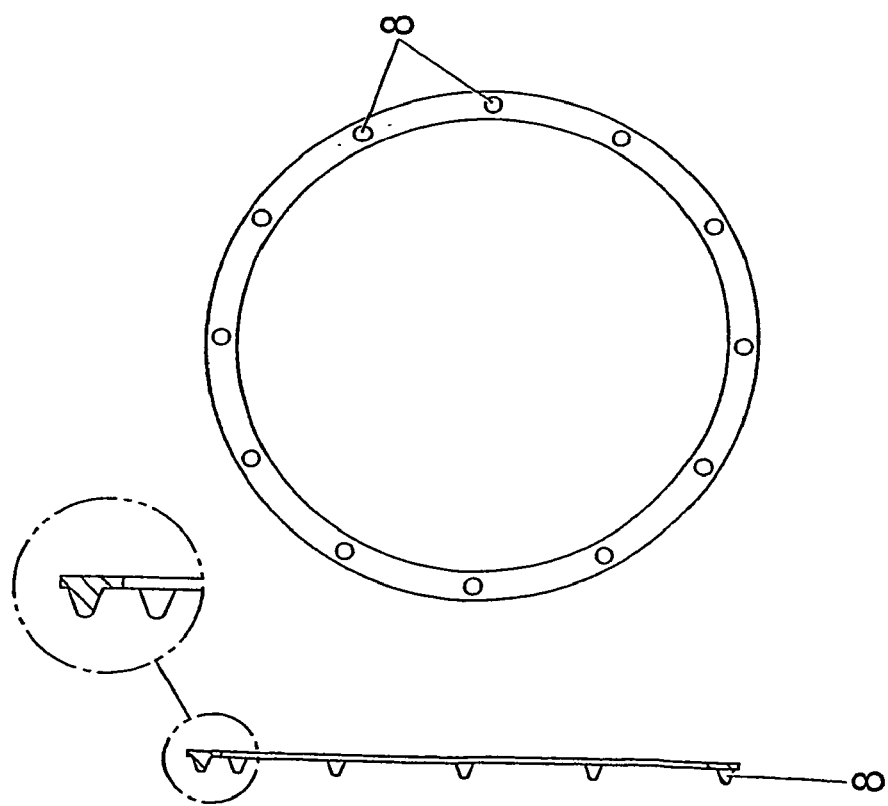
FIG. 1d is a cross-sectional view of a closure member and a plan view of a closure member.

Preferably the diaphragm is annular in shape as can be seen from the embodiment shown in FIG. 1e. In the embodiment where the annular member has a longitudinal end face which comprises a concave cross-section defining upper and lower arms, the diaphragm may extend between the upper and lower arms of the annular member and comprise apertures to allow flow of gas through the diaphragm when the seal assembly is in a non-sealing position. The diaphragm may be buckled in shape to increase the efficiency of its function as shown in FIG. 1e.

Preferably both the diaphragm and the closure member are annular in shape. In a preferred embodiment the annular member has a longitudinal end face which comprises a concave cross-section defining upper and lower arms; the closure member is attached by resilient means to one of said upper and lower arms; and the diaphragm extends between said upper and lower arms.

Under normal operating conditions, i.e., when the pipeline is not leaking and there is no ingress of liquid into the annular space, the seal assembly is in its non-sealing position. Should liquid leak into the annular space, the flow of liquid in the annular space causes movement of the diaphragm which causes movement of the closure member, which in turn closes the one or more orifices. Preferably the pressure of the liquid acts directly on the diaphragm causing the diaphragm to press against the closure member causing the closure member to move into a position where it closes the one or more orifices. The apertures in the diaphragm are closed on contact with the closure member. The seal assembly in its sealing position is shown in FIG. 1c. The direction of liquid flow is indicated by the arrows. In this first aspect of the invention, the liquid must flow towards the diaphragm to actuate the seal assembly from a non-sealing position to a sealing position.

In a second aspect of the present invention the annular member comprises one or more valves and said valves each comprise one or more orifices and moveable blocking means such that the flow of liquid in said annular space causes movement of the moveable blocking means to close said one or more orifices.

A valve comprises one or more orifices and moveable blocking means. FIGS. 2 and 3 show embodiments of valves according to this aspect of the invention. The valve may comprise a housing which as one or more orifices and which houses the moveable locking means. The valve may also be connected to tubing or hosing. The tubing or hosing may form an integral part of the housing. The valve may be situated within the tubing or hosing. The one or more valves may be attached to or form part of the annular member. Preferably the valve (and, if present, tubing) is insertable into the annular member. Preferably the annular member comprises one or more tubes in which tubes the one or more valves are situated.

In this second aspect of the invention the valve may be located on either face of the annular member, i.e., either on the face that confronts the flow of liquid or on the opposite face.

Figure 2A:
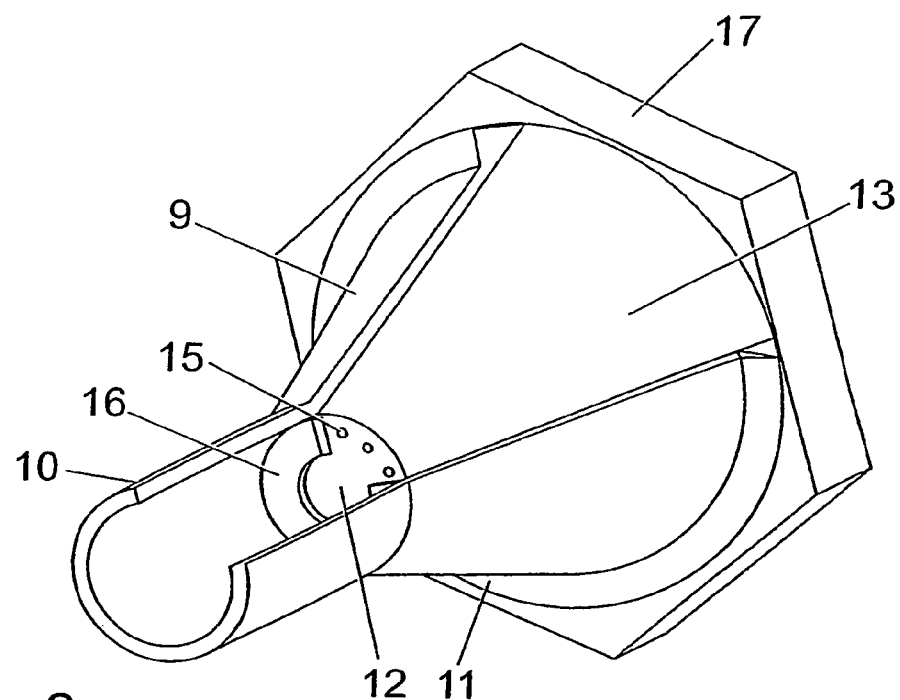
FIGS. 2a and 2b are perspective views of a valve for insertion into a seal assembly according to the second aspect of the present invention.
Figure 2B:
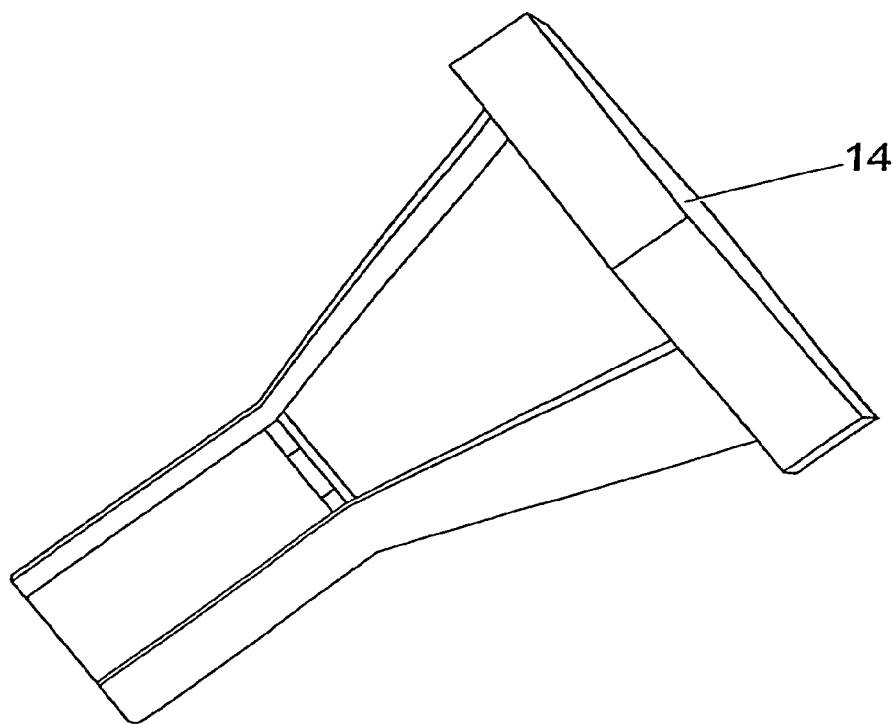
Figure 4A:
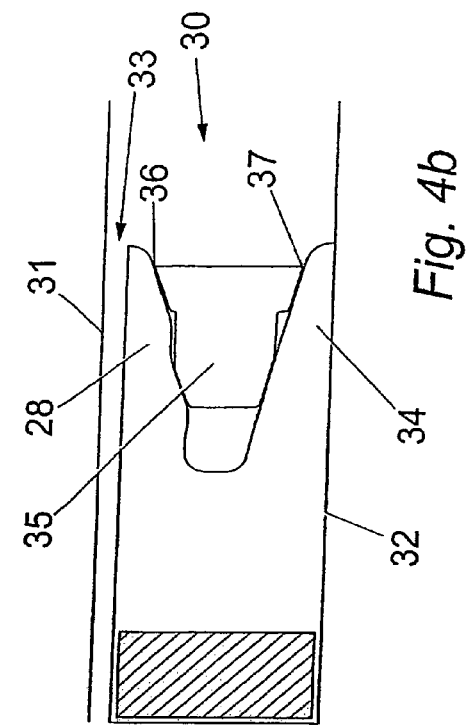
FIGS. 4a to 4d are cross-sectional views of a seal assembly according to the third aspect of the present invention.
Figure 4B:
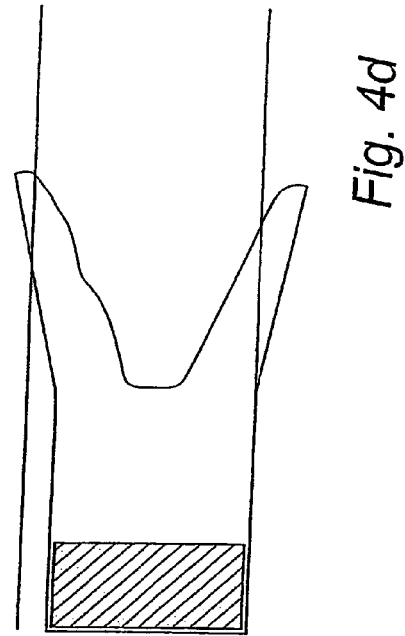
Figure 4C:
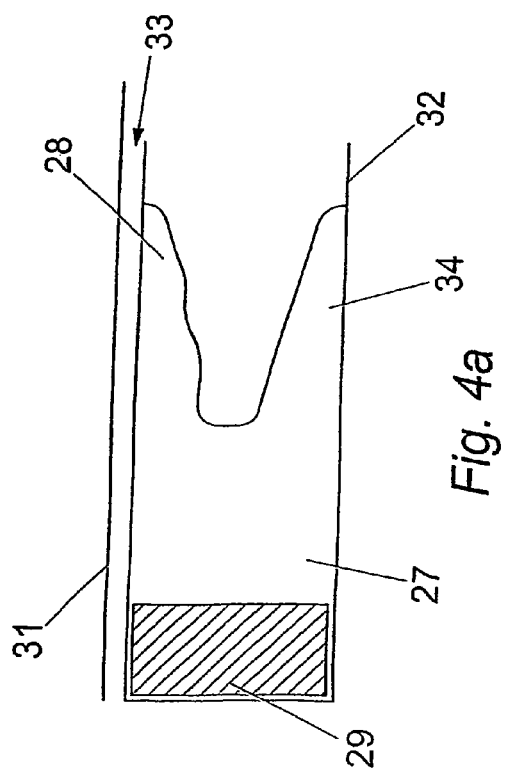
Figure 4D:
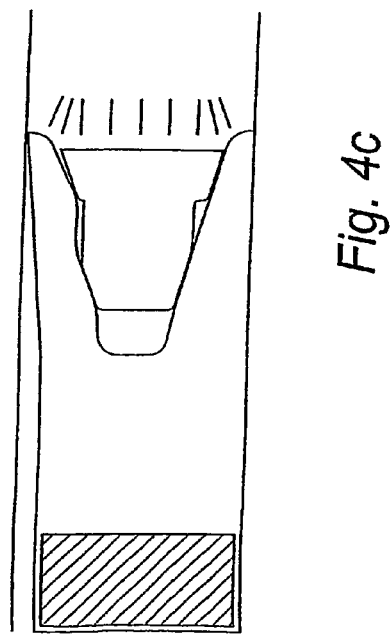

FIG. 2a shows a valve (9) and tubing (10) arrangement that can be inserted into the annular member. In this embodiment of the second aspect of the present invention a valve comprises a blocking plate (16) with an orifice and the moveable blocking means comprises a diaphragm (14) and a closure member (12) which closure member has apertures (15) such that flow of liquid in the annular space causes movement of the diaphragm which causes movement of the closure member against the blocking plate closing the orifice in the blocking plate and the apertures in the closure member. The valve comprises a housing (11) in the shape of a truncated cone and this may be located at the end of tubing. A membrane or diaphragm that is permeable to gas but not liquid covers the end of the housing having the larger diameter. The end of the housing having the smaller diameter (the nose) of the housing is formed by a blocking plate or ring (16) which has an orifice in it. In this embodiment the closure member comprises a plug having the shape of a truncated cone (13) which fits in a sleeve-like fashion into the housing. The nose of the plug has orifices in it. A retaining nut (17) holds the conical plug in place inside the housing in a preloaded position so that the nose of the plug is at a distance from the blocking plate or ring. This is the non-sealing position and is shown in FIG. 2b. When there is sufficient pressure of liquid on the membrane, the membrane will push on the conical plug so that it comes into contact with blocking plate and closes off the orifices.

Preferably the diaphragm is made of Gortex (trademark) and preferably the rest of the moveable means is made of a rubber type material. Silicone grease may be used during assembly on all sliding faces.

In this embodiment the valve may be located on either face of the annular member, i.e., either on the face that confronts the flow of liquid or on the opposite face. In either location the direction of the flow of liquid should be such that it confronts the diaphragm before the blocking plate.

FIG. 3 shows two further embodiments of a valve according to the second aspect of the present invention. In these embodiments the moveable blocking means comprises biased means attached to a closure member which biased means is held in a biased position by means of a liquid-sensitive material such that the presence of liquid in said annular space causes interaction of said liquid with said liquid-sensitive material causing said liquid-sensitive material to release the biased means so that said biased means effects movement of the closure member to close said one or more orifices.

FIG. 3a shows valve (18) in a non-sealing position which comprises housing (19), orificies (20, 21) and tubing (22). In this embodiment the valve housing is in the shape of truncated tubing and has orifices in the side walls as is shown in FIGS. 3a and b. The moveable blocking means comprises biased means (23) attached to a closure member (24). The biased means may be either a compression or a tension spring, preferably the biased means is a tension spring. The biased means is held in a biased position, for example a spring held in a compressed state, by means of liquid-sensitive material (25). Interaction with liquid in the annular space causes the liquid-sensitive material to react or dissolve thus releasing the biased means. Release of the biased means causes movement of the closure member into a position where it closes off the one or more orifices in the valve head. The valve in its sealing or closed-off position is shown in FIG. 3b. Preferably, in this embodiment the valve is located on the face of the annular member that confronts the flow of liquid.

FIGS. 3c and d show a further embodiment of a valve for insertion into a seal assembly according to the present invention, in non-sealing and sealing positions respectively. FIG. 3c shows valve (18) which comprises housing (19), orificies (20, 21) and tubing (22). The moveable means comprises a biased spring (23) and closure member (24). The spring is held in a compressed state by means of a retaining wire (26) which is restrained in position by a liquid sensitive material (25). When liquid enters the annulus the liquid sensitive material will react or dissolve on contact with the liquid, releasing the retaining wire and simultaneously releasing the spring. On release, the spring pushes closure member (24) close off the orifices (see FIG. 3d).

Preferably the liquid-sensitive material is a salt that will dissolve or partially dissolve on contact with the liquid or an absorbent material that will soften on contact with the liquid.

In a third aspect of the present invention the annular member is dimensioned so that it will be in sealing contact with only one of the inner wall of the outer pipe and the outer wall of the inner pipe and will provide an opening in said annular space between the annular member and the wall with which it is not in sealing contact and the moveable blocking means comprises resilient means which is deformable under the pressure of liquid flow in the annular space to close said opening.

An embodiment according to this aspect of the invention is shown in FIG. 4. The seal assembly of FIG. 4 comprises an annular member (27) and moveable blocking means (28). FIGS. 4a and 4b show the seal assembly in a non-sealing position in a pipe-in-pipe structure. The annular member is capable of being in sealing contact with only one of the inner wall of the outer pipe (31) and the outer wall of the inner pipe (32) thus providing an opening (33) in said annular space (30) between the annular member and the wall with which it is not in sealing contact. This is achieved by the appropriate dimensioning of the annular member. Preferably the annular member is capable of being in sealing contact with only the outer wall of the inner pipe.

In this aspect of the invention the moveable member comprises resilient means which is deformable under the pressure of liquid flow. The moveable member may be a lip on the annular member. Preferably the annular member and the moveable member are made from the same material. Preferably the annular member has a longitudinal end face which comprises a concave cross-section defining (or has a recess which defines) upper (28) and lower (34) arms and one of these arms is the resilient means deformable under the pressure of liquid flow in the annular space. Upper and lower relate to the larger circumference and the smaller circumference sides which define the end face, respectively. Preferably the lower arm is in sealing contact with the upper wall of the inner pipe. In this embodiment the upper arm is the resilient means moveable under the pressure of liquid flow.

Preferably, the larger diameter of the end face is larger than that of the outer pipe and the smaller diameter of the end face is smaller that that of the inner pipe of the pipe-in-pipe arrangement in which the annular member is to be used. This is so that in order to fit into the annular space, the annular member must be clamped closed and held in this position by an annular restraining means (35). The annular restraining means has a complementary shape to the concave recess in the end face of the annular member. Preferably the annular restraining means is bonded (36, 37) to the lower and upper arms respectively of the annular member, thus restraining them from moving apart. This bond may be made by a water-soluble glue/adhesive.

In this third aspect of the invention the longitudinal end face having a recess confronts the flow of liquid. In operation, flow of liquid will exert force on this end face. The most vulnerable component of the seal assembly to this force is the upper arm (moveable means) and when the force is sufficient to break the bond between it and the annular restraining means, the upper arm is pushed against the inner wall of the upper pipe thus effecting a seal (see FIG. 4c).

The present invention also provides a pipe system comprising an inner pipe and an outer pipe and a seal assembly selected from the seal assemblies described herein. Preferably the seal assemblies are installed in pairs in order to prevent the passage of liquid in both directions. The annular space in the pipe system may also comprise insulation material and/or one or more elements chosen from bulkheads to transfer loads (services or handling loads) between the carrier pipe and the flowline; spacers to centre the flowline within the carrier pipe; buckle arrestors to prevent the propagation of a buckle along the carrier pipe. Preferably the seal assemblies are installed near to buckle arrestors so that when buckle propagation is stopped, any water leak due to the buckle will not be allowed to proceed through the pipeline.

The invention claimed is:

1. A seal assembly comprising:
   an inner pipe and an outer pipe in a double-walled subsea pipeline, wherein the inner pipe has a normal operating condition wherein it is connected and operable for transmitting a hydrocarbon through the inner pipe;
   an annular space formed between the inner pipe and the outer pipe wherein the annular space has a normal operating condition wherein it is connected and operable for permitting gas to pass through the annular space; and
   a seal in the annular space and operable for sealing the annular space,
   wherein the seal under the normal operating conditions of the inner pipe and the annular space is in a non-sealing position which allows passage of a gas through the seal assembly; and
   wherein under the normal operating conditions of the inner pipe and the annular space, the seal is actuatable from the non-sealing position to a sealing position in response to entry of liquid into the annular space.

2. A seal assembly according to claim 1 wherein in the non-sealing position, the seal provides an opening past the seal and in the annular space to allow passage of the gas through the seal; and wherein the seal comprises an annular member defining the opening past the seal and a moveable block operable such that entry of liquid into the annular space causes movement of the block to close the opening in the annular space.

3. A seal assembly according to claim 2 wherein the block is moveable under pressure of liquid flow in the annular space.

4. A seal assembly according to claim 3 wherein
   (a) the annular member comprises one or more orifices; and
   (b) the moveable block comprises a diaphragm and a closure member placed in the annular space such that flow of liquid in the annular space causes movement of the diaphragm and the movement of the diaphragm causes movement of the closure member to close the one or more orifices.

5. A seal assembly according to claim 4 wherein the diaphragm and the closure member are both annular in shape around the inner pipe.

6. A seal assembly according to claim 2 wherein:
   (a) the annular member comprises one or more valves; and
   (b) each of the valves comprises one or more orifices and the moveable block such that flow of liquid in the annular space causes movement of the moveable block to close the one or more orifices.

7. A seal assembly according to claim 6 wherein each of the valves comprises a blocking plate with an orifice and the moveable block comprises a diaphragm and a closure member, wherein the closure member has apertures such that flow of liquid in the annular space causes movement of the diaphragm which causes movement of the closure member against the blocking plate closing the orifice in the blocking plate and the apertures in the closure member.

8. A seal assembly according to claim 6 wherein the moveable block comprises a biased element attached to a closure member and the biased element is held in a biased position by a liquid-sensitive material such that flow of liquid in the annular space causes interaction of the liquid with the liquid-sensitive material causing the liquid-sensitive material to release the biased element so that the biased element effects movement of the closure member to close the one or more orifices.

9. A seal assembly according to claim 8 wherein the biased element is a spring.

10. A seal assembly according to claim 8 wherein the liquid-sensitive material is a water-soluble salt.

11. A seal assembly according to claim 6 wherein the annular member comprises one or more tubes and the one or more valves are situated in the tubes.

12. A seal assembly according to claim 2 wherein the annular member is dimensioned so as to extend from an inner wall of the outer pipe to an outer wall of the inner pipe and as to be in sealing contact with each of the inner and the outer walls while the annular member has the opening therein past the seal.

13. A seal assembly according to claim 2 wherein
   (a) the annular member is dimensioned so that in the normal operating conditions, the annular member is in sealing contact with only one of an inner wall of the outer pipe and an outer wall of the inner pipe so as to provide an opening in the annular space between the annular member and the wall with which the annular member is not in sealing contact; and
   (b) the moveable block comprises a resilient element which is deformable under the pressure of liquid flow in the annular space to close the opening.

14. A seal assembly according to claim 13 wherein the annular member has a longitudinal end face which has a recess to define upper and lower arms and wherein one of the arms is the resilient element deformable under the pressure of liquid flow in the annular space to close said opening.

15. A seal assembly according to claim 14 further comprising an annular restraint bonded to the upper and lower arms of the annular member.

* * * * *